United States Patent [19]

Koenig

[11] Patent Number: 5,610,600
[45] Date of Patent: Mar. 11, 1997

[54] OPERATION VERIFICATION SYSTEM AND METHOD FOR NAVIGATIONAL INSTRUMENTS

[76] Inventor: Robert H. Koenig, 3651 Coats Rd., Burdett, N.Y. 14818

[21] Appl. No.: 255,189

[22] Filed: Jun. 7, 1994

[51] Int. Cl.$^6$ .................................................. G01C 21/00
[52] U.S. Cl. .......................... 340/976; 324/155; 342/401; 342/411; 455/226.4
[58] Field of Search ..................................... 340/514, 515, 340/516, 971, 974, 976, 979, 945; 455/67.1, 67.4, 226.4, 222; 324/155, 125, 157; 342/420, 421, 439, 401, 411, 413; 73/865.9

[56] References Cited

U.S. PATENT DOCUMENTS

| | | | |
|---|---|---|---|
| 2,486,641 | 11/1949 | Gilbert | 324/155 |
| 2,827,610 | 3/1958 | Hiser | 324/155 |
| 2,837,636 | 6/1958 | Richard, Jr. | 455/226.4 |
| 3,467,867 | 9/1969 | Armes et al. | 455/226.4 |
| 3,716,791 | 2/1973 | Harries et al. | 342/420 |
| 3,750,177 | 7/1973 | Rooks | 342/411 |
| 3,845,484 | 10/1974 | Sawicki et al. | 342/401 |
| 3,887,872 | 6/1975 | Sharpe | 342/420 |
| 4,535,325 | 8/1985 | Marsh | 324/155 |
| 4,742,561 | 5/1988 | Tipton | 455/226.4 |
| 4,996,717 | 2/1991 | Koenig | 455/222 |
| 5,241,698 | 8/1993 | Koenig | 455/222 |

OTHER PUBLICATIONS

Lawton, R., IFR Refresher, "When the Glideslope Fails" Mar. 1994, vol. 8 Issue 3.

*Primary Examiner*—Brent A. Swarthout
*Attorney, Agent, or Firm*—Barnard, Brown & Michaels

[57] ABSTRACT

An instrument verification system which causes the instrument needles to "bob" periodically—a sharp momentary deflection from center. If desired, the flags can also be "dipped" at the same time, verifying their operation as well. The pilot can easily distinguish the momentary deflection of the needles from the more gradual changes caused by deviation from true course, and is assured that the centered needles mean perfect flying and not instrument failure.

18 Claims, 6 Drawing Sheets

OPERATION VERIFICATION SYSTEM AND METHOD FOR NAVIGATIONAL INSTRUMENTS

FIELD OF THE INVENTION

The invention pertains to the field of navigational instruments. More particularly, the invention pertains to safety devices for aircraft navigational instruments to test and warn of failure of the instruments.

BACKGROUND OF THE INVENTION

My previous patents, "Radio Receiver Operational Checking Method and System including Reactive Coupling", U.S. Pat. No. 5,241,698, and "Radio Receiver Noise Squelching and Operational Indicating Alarm", U.S. Pat. No. 4,996,717, addressed the problem of checking the operation of radio communications receivers. This invention relates to the checking of navigation equipment in a similar manner.

Flying an airplane without reference to outside landmarks, such as landing by the Instrument Landing System (ILS) or en-route navigation using the military TACAN or civilian VHF-Omirange (VOR) or Area Navigation (RNAV) system, is sometimes referred to as "Flying the needles" or "On the gauges". The pilot is in or above the clouds and cannot depend on his senses and vision to tell him what the airplane is doing. He must trust to gauges, usually electro-mechanical devices which are prone to failure.

The Instrument Landing System (ILS) directs the airplane along a threedimensional path in space which ends over the runway. The horizontal dimension is delineated by a radio signal called the Localizer signal. In the airplane the "localizer indicator" is a meter needle which moves to the left or right to tell the pilot which direction to correct for a perfect centered approach. Likewise a "glideslope needle" is a horizontal bar which moves up or down to tell the pilot to fly up or down. The needles are centered in mid position when the airplane is on the proper safe path to the runway.

The system wisely employs a indicator in the form of a red flag which drops into view when the all important ILS signals are not adequate. For a proper safe landing the airplane is flown so that the needles are centered and the flag is out of view, together showing that the airplane is on the correct vertical and horizontal paths.

Now here is the cause for concern. Stationary needles as just explained show that all is well with the approach or navigation. But stationary centered needles can also be the result of inactive malfunctioning indicators. This could be due to the needle movements themselves being stuck or disconnected, or the solid state component feeding control power to the needle indicators could have failed. A tripped circuit breaker or an opened connection will cause needles to center, and this has caused dangerous confusion. Unlikely as these things are, they are a dangerous possibility when relying on motionless needles or flags. While intently watching the needles a flyer might not notice if the no-signal flag has dropped, or the flag might well not drop if the signal is correct but the indicator or driver circuitry has failed.

Thus, the situation has been set up where perfect flying is indistinguishable from instrument failure.

This was exactly the case in a recent accident involving an Alitalia DC-9, in which the crew flew into the side of a mountain while following an inoperative glide slope indicator. (See "When the Glideslope Fails"; *IFR Refresher*; Belvoir Publications, Inc.; Vol. 8 Issue 3, March 1994).

Some pilots have attempted to compensate for this design flaw by always flying with the needles slightly off center. This will give some warning of failure, but it is not a satisfactory technique for instrument approaches or for rapidly-changing conditions. A means is needed to constantly monitor the condition of the instruments, while allowing the pilot to fly a perfect approach with the needles properly centered.

The object of this invention is to save lives by enhancing the safety of Aircraft navigation Instruments and specifically the Instrument Landing System indicators. This is accomplished by checking and monitoring the navigational indicating equipment. The danger addressed by this invention is that failure of the system due to any one critical part can occur unnoticed by the crew even though thoughtful design has gone into the system and the equipment.

This invention has approached the situation with these criteria:

1. To check the possible failure modes which exist in present equipment.
2. To be inherently simple in concept.
3. To do its job of checking with no added work load to the pilot(s).
4. To be invisible to the existing aircraft circuitry and operation, causing no changes or shifts because of its employment.
5. It should be simple to install.
6. It should ideally be economical to manufacture and install.

These criteria have been addressed by this invention as will be shown.

SUMMARY OF THE INVENTION

The invention presents an instrument verification system which causes the instrument needles to "bob" periodically—a sharp deviation from center. If desired, the flags can also be "bobbed", verifying their operation as well. The pilot can easily distinguish the momentary deflection of the needles from the more gradual changes caused by deviation from true course, and is assured that the centered needles mean perfect flying and not instrument failure.

Several methods are described which achieve the navigation instrument testing by bobbing the needles and dipping the flags. The preferred method operates into the antenna input of the navigation (NAV) receiver using special T-couplers. This has the advantage of not requiring internal connections to the instrument, and testing the entire system, but requires more parts.

An alternate embodiment capacitively induces the bobbing voltage pulses onto internal control points to test the needle mechanism and the solid state drivers.

A third embodiment inductively couples test pulses onto wires to the needle and flag mechanisms by means of transformers where the needle-moving current flows through the secondary windings, and pulses imposed on the primaries cause the needle and flag deviations. A stuck needle or flag, or an open connection, is indicated by the lack of the periodic bobbing or dipping.

DETAILED DESCRIPTION OF THE INVENTION

The invention introduces a slight bobbing or dipping onto the indicator needle which is being verified. The resulting movement confirms the operation of the instrument, and is recognizable and reassuring to the pilot.

Preferably, this variation will be applied to the Localizer and Glide Slope needles, and the "No-Signal" Flags associated with each of these. The fact that the needles move slightly in what we will call bobbing, and the flag appears momentarily which we shall call a "dipping", indicates that the needle movement and the circuitry driving them are all functioning. Furthermore the bobbing of the needles may actually cure or prevent what might otherwise cause a stuck needle movement. Every engineer or scientist habitually taps the face of a d'arsonval meter when reading a meter which is critical or precise. Tapping the meter breaks any static friction which may be present. The bobbing action performs similarly in breaking static friction in addition to giving an indication by its motion.

Figure 1A:
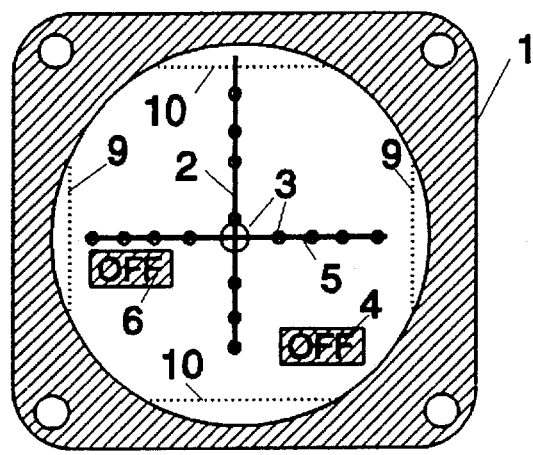
FIG. 1a shows a glide-slope indicator in inactive condition.
Figure 1B:
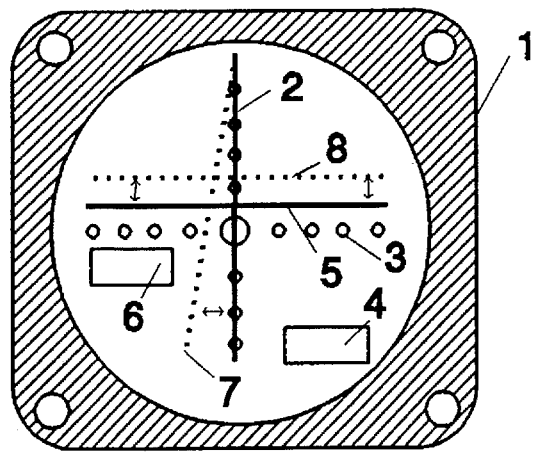
FIG. 1b shows the indicator of FIG. 1 in operation, incorporating the invention.

FIGS. 1a and 1b show a simplified ILS indicator which may be used with the invention. For clarity, compass-bearing dials and knobs are omitted in the figures. In FIG. 1a, the indicator is shown as it might look when the glide-slope receiver is not in operation (turned off, or not tuned to an active localizer/glide-slope signal). Some glideslope indicators retract out of sight when no signal is present, but the invention is beneficial also in this case.

The indicator (1) has two needles: a horizontal glide slope needle (5) which moves up and down to indicate if the airplane is below or above the desired descent slope, and the localizer needle (2) which moves left and right to indicate if the airplane is centered on the runway (or on the set course, when used as a CDI). The dots and circle (3) serve to mark when the needles are centered, as would be desired when flying exactly on the glide slope toward a landing. In FIG. 1b, for example, the indicator says that the airplane is centered on the runway (centered localizer needle (2)), but is somewhat low (the glideslope needle (5) is above the dots (3)). The needles have a fairly wide range of swing, as shown by the dotted limits marks (9) for the localizer needle (2) and (10) for the glideslope needle. The better indicators have "rectilinear movements" as shown for needle (5)—the needles remain horizontal or vertical and move directly up/down or left/right. Simpler movements may pivot on one end or the other, as shown for needle (2).

The indicator will usually have two "flags" which let the pilot know if one or both of the required signals is missing: the glide slope no-signal flag (6), and the localizer no-signal flag (4), both of which are shown in FIG. 1a as having dropped down into view to indicate lack of safe signal. Typically, the flags will be striped in red and white to stand out immediately. When the signals are being received, the flags retract as shown in FIG. 1b.

It should be noted that the centered indication of the needles in FIG. 1a would occur under two conditions: the airplane is flying down the glide slope toward a perfect instrument landing, or the instrument has failed and the pilot is flying the airplane blissfully unaware that he is completely unguided. The flags (4) and (6) are supposed to warn if there is a loss of signal by dropping into view as shown in FIG. 1a, but failure of the flag, driver or decoder circuitry could prevent the flag from presenting its warning.

This invention will be presented as an add-on for use with existing equipment, but it will be understood that the invention can very easily be incorporated in newly designed instruments.

The test pulses of the invention would be adjusted to bob the needle approximately one bar of deflection or less as shown in FIG. 1b, although it could be set to however much deflection is ultimately found desirable.

Figure 3:
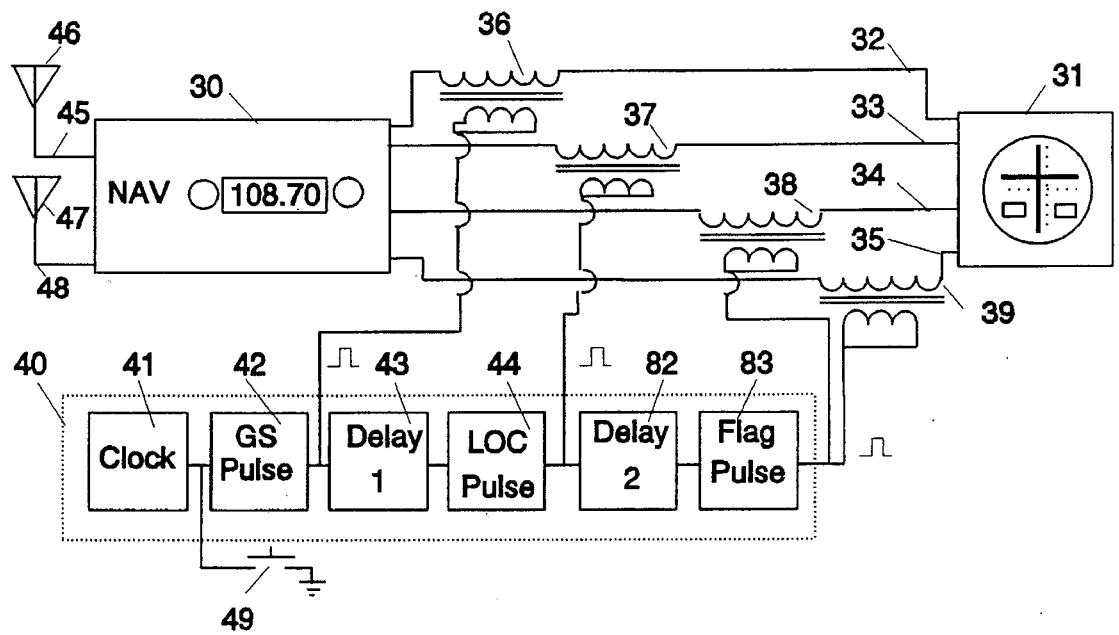
FIG. 3 shows a diagram of the circuitry of the invention, in its inductively indicator-connected embodiment.

Referring to FIG. 3, the navigation radio (30) is connected to localizer (46) and glideslope (47) antennas by lengths of coaxial cable (45) and (48), respectively. The radio (30) is connected to the Course Deviation Indicator (CDI) (31) via wires (32)–(35) which control the glideslope needle and localizer/VOR needle and their associated flags, respectively.

FIG. 3 shows an embodiment where the needle bobbing pulses inductively couple to the wires (32)–(35) running to the indicator (31) using transformers (36)–(39). This is simple and useful where the indicator is separated from the radio and driver electronics.

Figure 8:
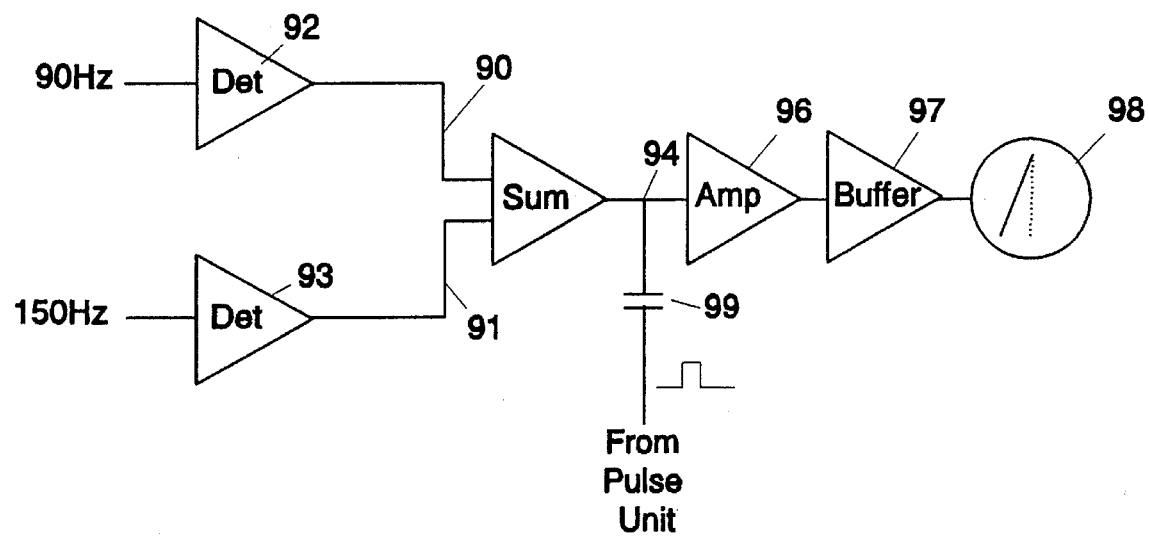
FIG. 8 shows a detail of an alternate injection point for the pulses of the invention, in the indicator-connected embodiment.

FIG. 8 shows connection into NAV equipment using capactively coupled pulses. The bobbing test signals can be introduced from a unit housing the pulse generator(s) (40) to the NAV indicator (31 ). These signals introduce fluctuations through blocking capacitors of approximately 1 μfd onto the voltages which position the glideslope needle (21 ), the Localizer left/right needle (33), and the no-signal flags (34) and (35). These connections are made through unused pins on the terminal block or through an additional retrofitted connector. These connections can be made by a competent Avionics technician with instructive guidelines.

The bobbing signals are supplied by simple timer square wave pulse generators which can be decoupled with isolating capacitors to the signal voltages used to position the needles and the flags (see FIG. 8). Regarding the important matter of de-coupling or isolation which avoids disturbance to normal safe functioning, a quality capacitor serves reliably. Adding to this reliability factor is the fact that only signal voltages are involved, and furthermore any failure of the capacitor would show up as an offset non-bobbing needle which would declare itself malfunctioning, and the pilot would perform the safe missed approach procedure.

Timer type pulse generating circuits are well described in electronic texts. Simple integrated circuit timer circuits using type 555 or 322 timer IC's perform perfectly as pulse generators for the invention. They are Integrated Circuits (ICs) which produce positive pulses at their output pins when a negative spike is introduced at a trigger pin. Duration and duty cycle of the output pulse is determined by choice of resistor and capacitor. They may be wired to act as oscillators (self-triggered to run at a given frequency), or as a monostable (executes one timed cycle when triggered).

Figure 2:
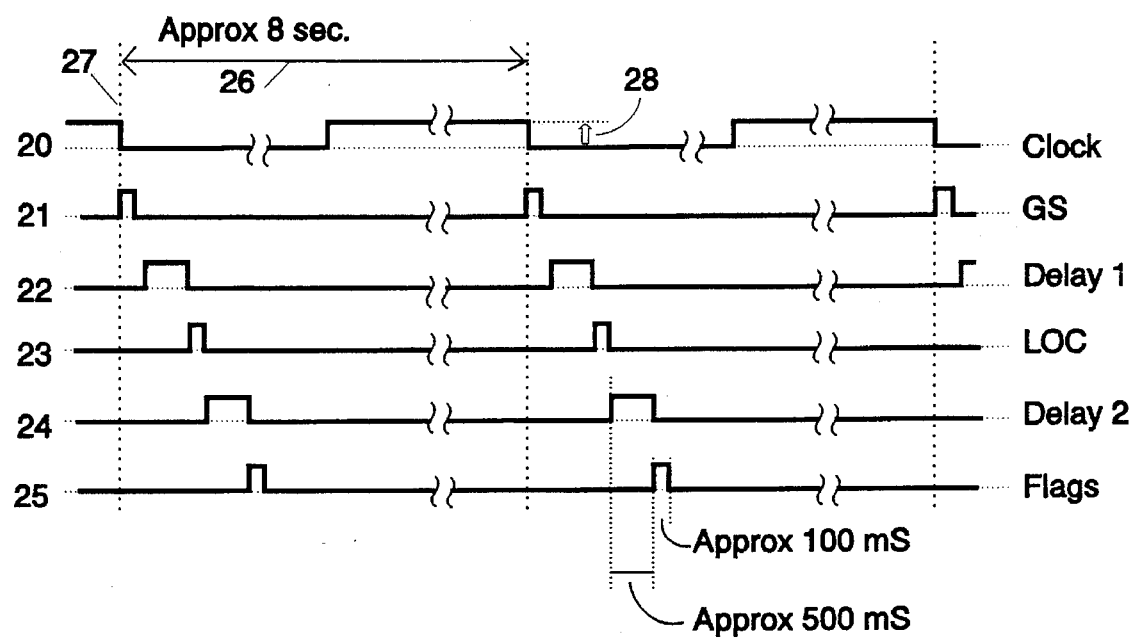
FIG. 2 shows a timing diagram of typical pulses produced and utilized in the invention.

FIG. 3 shows in block form six timer circuits as would be used to generate the sequence of pulses shown in FIG. 2. Timer (41) functions as an oscillator or clock, with an approximate 8 second period as shown at (20). The other timers (42)–(44) and (82)–(83) are wired as monostables.

The falling (negative-going) edge of the (20) waveform triggers glideslope pulse generator (42), which responds with a pulse of approximately 100 millisecond duration (21). This pulse is inductively coupled to the glideslope needle circuit (32) by transformer (36).

The negative-going edge of (21) triggers delay timer 1 (43), which generates a delay pulse of approximately 500 millisecond (22). This pulse, in turn, triggers localizer pulse generator (44), which responds with a pulse of approximately 100 millisecond duration (23). This pulse is inductively coupled to the localizer needle circuit (33) by transformer (37).

The negative-going edge of (23) triggers delay timer 2 (82), which generates a delay pulse of approximately 500 millisecond (24). This pulse, in turn, triggers flag pulse generator (44), which responds with a pulse of approximately 100 millisecond duration (25). This pulse is inductively coupled to both flag circuits (34) and (35) by transformers (38) and (39).

If desired, the pulse unit (40) can include the option of a push button or switch (49) whereby the pilot can initiate the bobbing test signals. Automatic repetitive bobbing signals make the checking effortless and continuous, however, and do not burden the pilot who can become very busy. A push button alone or as a supplement to the automatic pulses, as shown, could be employed if desired.

In the indicator-connected embodiment shown in FIG. 8, the pulses can be injected on the indicator drive lines, as shown—DC isolated with a coupling capacitor (99). This method is useful and simple when it is acceptable to modify the radio or if the invention is to be incorporated into newly designed equipment. The pulse signals can be injected at the summation point (94) of the DC outputs (90)(91) of the 90 hz (92) and 150 hz (93) detectors (corresponding to left and right for the localizer and up/down for the glideslope). A balanced condition of the two signals places the needle in the centered position. This point for injection of the bobbing test signal verifies that the solid state amplifier (96) and buffer (97) stages which follow are working, as is the needle movement (98) itself. The performance ahead of the summing circuit depends largely on the presence and correct detection of a received signal from the ground, which is verified by the no-signal flags.

The time intervals for the test bobbing and the flag dipping as well as exact sequencing can vary within the teachings of the invention. For example, all three tests could be performed simultaneously at intervals or could be initiated by a push button. This simultaneous testing is the simplest method, and might therefore prove desirable. The left-right (localizer) needle, the Glide Slope bar, or the no-signal flags could alternately be bobbed at separate times in a distinctive sequence or any combination. A suggested arrangement shown in FIG. 2, as implemented in FIG. 3, would be to have the tests performed in quick succession, every eight seconds approximately. This distinctive recognizable pattern of test makes obvious any change from the norm—which is to say malfunction.

Figure 4:
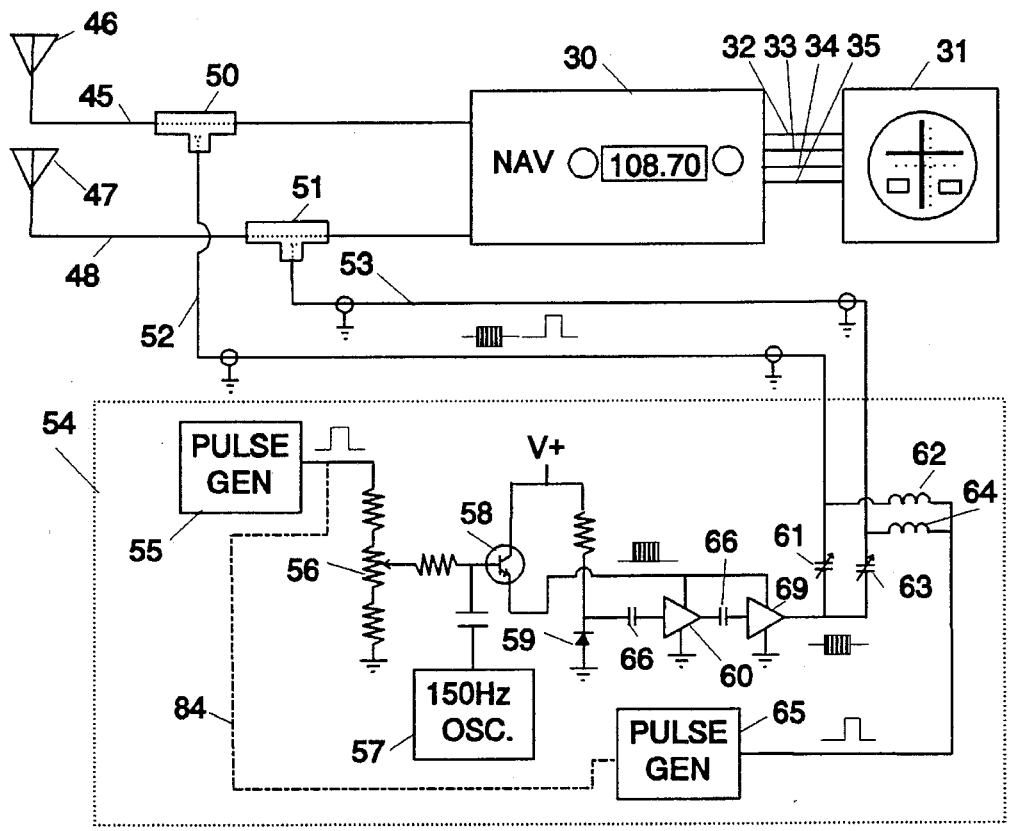
FIG. 4 shows a diagram of the circuitry of the invention, in its preferred (antenna-connected) embodiment.

The preferred embodiment shown in FIG. 4 couples the test signal into the antenna, rather than into the indicator circuitry. The advantage of this method is that all connections are external to the navigational hardware, and the invention tests the entire navigational receiver system, rather than just the indicator.

The NAV receiver (30) and CDI (31), and associated antennas (46) and (47) for glideslope and localizer, respectively, are the same as shown in FIG. 3. The antenna feedlines (45) and (48) are routed through T-couplers (50) and (51). Preferably, these will have conventional BNC- or TNC-type connectors at all connections, allowing the T-couplers to be inserted into the antenna feedlines. The T-couplers (50) and (51) are connected to the test unit (54) through coaxial cables (52) and (53), respectively. Alternatively, the test signal could be fed into the NAV receiver antenna by broadcasting through a separate antenna, instead of using the T-couplers shown, within the teachings of the invention.

Figure 5:
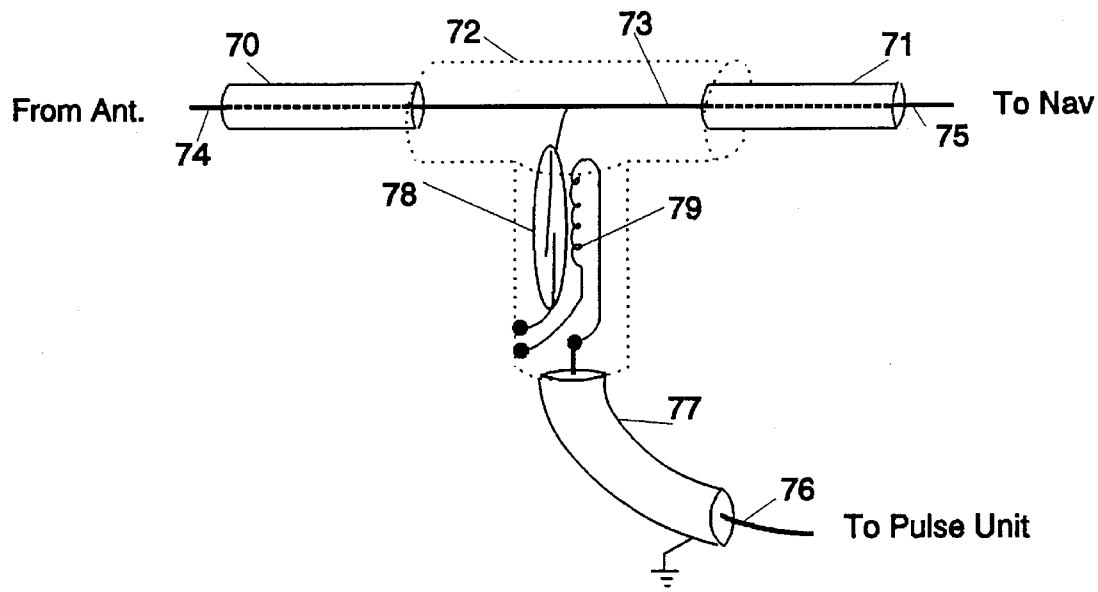
FIG. 5 shows a detail of the T-coupler used by the invention in its preferred (antenna-connected) embodiment.
Figure 9:
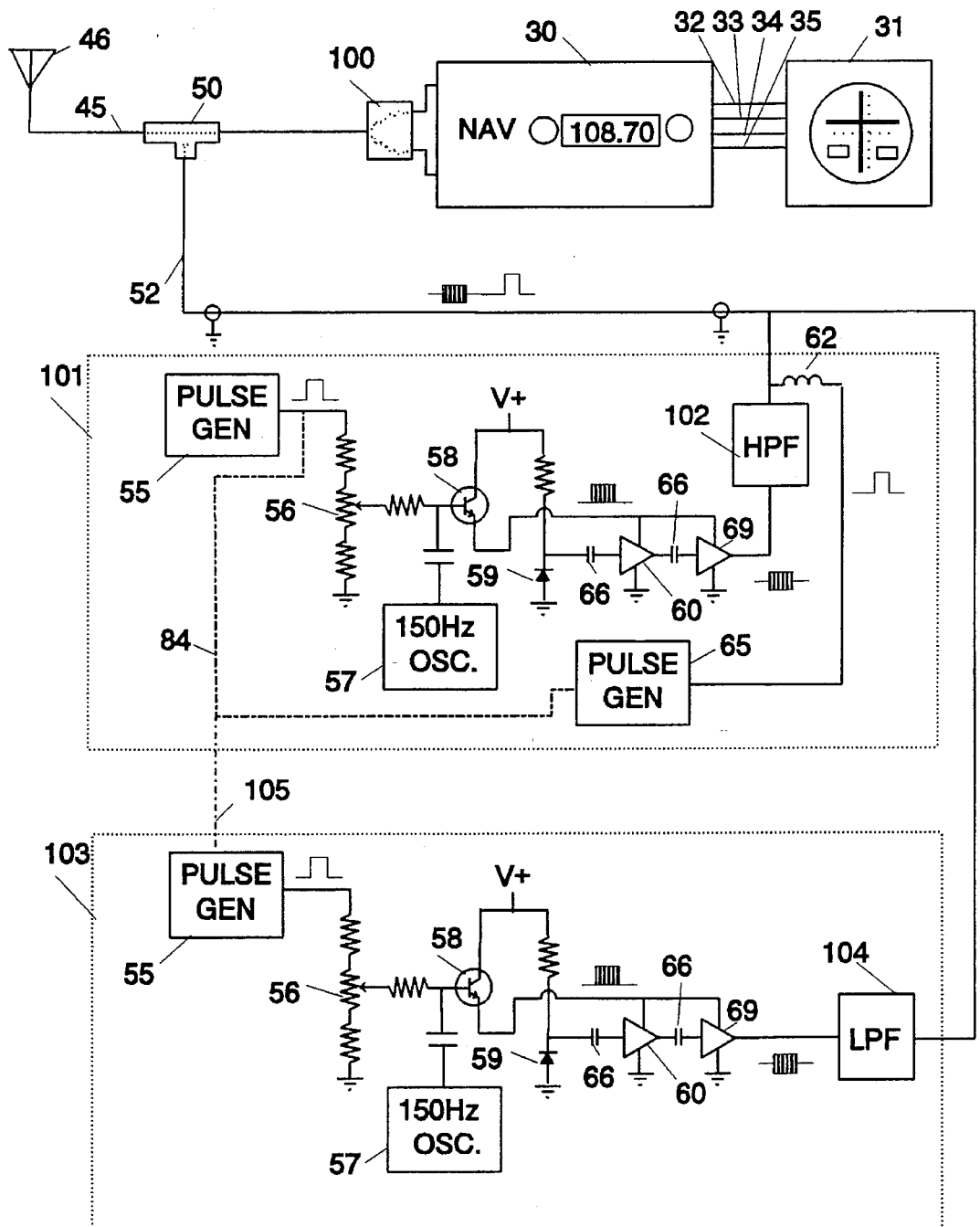
FIG. 9 shows a version of the preferred embodiment, for use in single-antenna ILS receiver installations.

FIG. 5 shows a detail of one of the special T-couplers (72), which is ghosted in to show the internal details. In FIG. 4, a separate T-coupler is shown for the glide slope antenna and for the localizer antenna. A single antenna is more often used, however, which would employ one T-coupler with a splitter. This is shown in FIG. 9 and will be described later.

The coaxial cable from the antenna has an outer braided shield (70), and a center conductor (74). Similarly, the coax to the radio consists of a center conductor (75) within a braided shield (71), and the coax leading to the pulse unit has a center conductor (76) and shield (77). The center conductor from the antenna line (74) is continuous through the T-coupler (73) and to the radio (75). All of the shields and the shell of the T-coupler (72) are grounded.

The T-coupler (72) is invisible to the normally working receiver because the coaxial center conductor (73), (74) and (75) remains connected straight through to the receiver, and does not connect to any impedance changing component. The coaxial shield (70) and (71) is similarly continuous across the body of the T-coupler (72).

The special T-coupler contains a small reed relay having a normally open sealed glass switch element (78) activated by a coil (79). The normally open switch element is connected to the antenna center conductor (73) and to the T-coupler shell (72) (i.e. to ground). The reed relay (79) is a commercially available item, such as the model HE3321 A0400 manufactured by Hamlin/Electrol. When a DC signal is passed through the coil (79), the normally open switch element (78) closes, grounding the antenna center conductor (73) momentarily, thus testing the no-signal flag.

The relay coil (79) connects from the test unit coaxial center conductor (76) and to the grounded shell (72), and so is actuated to close the reed switch (78) when a DC voltage (pulse) is applied to the center conductor (76). The inductance of the relay coil (79) acts as an RF choke, permitting the VHF energy of the broadband noise signal to appear on the center conductor (76) with no shunting. Stray coupling capacitance inside the T-coupler between the conductor (76) and the antenna conductor (73) will introduce the RF test pulse into the NAV receiver antenna line (75). Calculations and tests show that stray capacitance of one picofarad is adequate at VHF frequencies to bob the needles.

Figure 6:
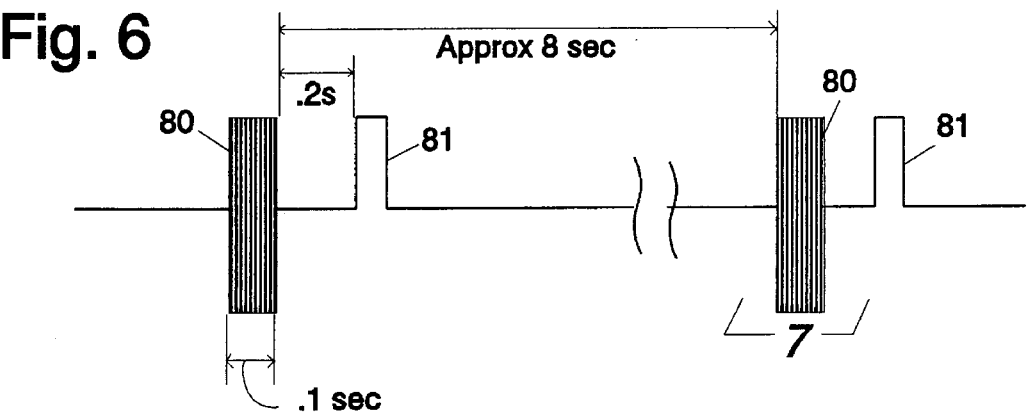
FIG. 6 shows a timing diagram of the pulses output by the preferred (antenna-connected) embodiment of the invention.
Figure 7:
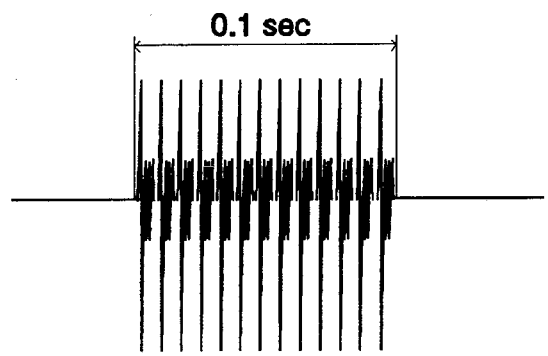
FIG. 7 is a detail of a single RF pulse from FIG. 6.

The pulses which bob the needles are shown at (80) in FIG. 6. A single pulse is shown in more detail in FIG. 7. The needle bobbing signals are made up of radio frequency "white noise" energy which is "heard" at all frequencies. This white noise broadband signal is amplitude modulated, preferably at 150 hz.

The Instrument Landing System (ILS) system is made up of the localizer and the glide slope signals, which function similarly. Each consists of a pair of directional radio signals on the same frequency but modulated by two different audio frequencies. For example, the glideslope transmitters will have a directional transmitter antenna carrying a signal with a 90 Hz modulation pointed slightly above one having 150 Hz modulation.

When on the correct glide path the 150 "fly-up" signal and the 90 hz "fly-down" signal are received with equal strength, giving a balanced middle position for the glide slope needle. Accentuating the 150 hz component during the test pulse causes the needle needle to move upward, thus verifying the navigating avionics equipment.

The exact same function takes place for the localizer with horizontally separated (left/right) signals. Although the tuned carrier is different and specific for each runway, the broad spectrum white noise is received at all the airport frequencies, and the same 90 Hz (fly right) and 150 Hz (fly left) modulation frequencies are used.

The pulse upsets momentarily the existing balance between up/down and right/left voltages because the receiver filters interpret the 150 Hz modulation as being one of the two tones which are summed to generate the glideslope indication. As a result, the needles bob momentarily toward the 150 Hz signal side (up or left, for the glideslope or localizer, respectively). If desired, the other (90 Hz) audio frequency could be used instead, which would merely make the needles bob the other way—but prudence avoids using a "fly-down" signal as a test.

A possible technical alternative which might be applied within the teachings of this invention is to have the 150 hz modulating signal varied in frequency through a modest sweep range. A sweep from 130 to 170 hz gives a repeatable deflection as it sweeps through 150 hz. Similarly, instead of a broadband white noise radio signal, a sweep UHF carrier frequency could be used, and the 150 hz information component could be furnished by sweeping at a 150 hz rate or by ordinary AM modulation.

To dip the no-signal flags, a DC pulse (81) is applied to the coaxial conductor (76), which activates the reed relay coil (79). This causes the reed switch (78) to close, momentarily shorting the antenna lead (74) to ground. The receiver loses the incoming signal, and the no-signal warning flag(s) will briefly dip to prove that they are working.

It should be pointed out that the momentary shorting out of the antenna wire by the reed relay in the T-coupler performs a significant diagnostic function test in itself. It is possible, therefore, that the invention can be implemented solely through the intermittent grounding of the antenna through pulses applied to the reed relay, although this is not preferred.

Referring now to FIG. 4, the timing pulses used to time the bobbing and dipping of the needles and flags are generated by conventional timer integrated circuits such as the 555 or 322 units. The pulse generators for needle bobbing and flag dipping are shown at (55) and (65), respectively.

The circuit for generating the needle bobbing radio pulses through the antenna will be discussed first.

The timing of the pulses is determined by the pulse generator (55). The generator is preferably set to produce pulses of approximately 0.1 seconds in length at approximately 8 second intervals. The output of the pulse generator is fed through voltage divider (56) to a transistor emitter follower (58) acting as a buffer. At the same time, a modulating signal of 150 Hz is generated by an oscillator (57), and is also fed to the base of the transistor (58), causing the audio modulation to be impressed upon the pulses. The 150 Hz oscillator can be another 555 or 322 IC.

A remarkable Schotke noise diode (59) is used to generate a wideband noise signal. Suitable are the NC302L from Noise Com Inc., Paramus, N.J. or the MDF805 from MDF Inc., Danbury Conn. Its output is amplified 50 to 60 dB of power gain, preferably by a pair of MMIC integrated Circuit wide band amplifiers (60) and (69), coupled with a suitable coupling capacitor (66). Suitable amplifier IC's are type SA5204AN.

The multi-stage IC broadband amplifier stages (60) and (69) are powered by the modulated DC pulse output of the emitter follower. These DC pulses with impressed audio modulation simultaneously key the amplifier stages and modulate the output. The adjustable voltage divider (56) sets the amplitude of these pulses, and thus the amplitude of the amplifier RF pulse output, which is adjusted for a minimum usable signal so as not to overload the receiver or to spuriously spill radiation. The output of the amplifier is shown at (80) in FIG. 6, and a single pulse is detailed in FIG. 7.

The modulated RF pulses can be balanced in level by capacitors (61) and (63) and fed into coax lines (52) and (53). The wideband modulated signal will override any received signal, and cause the needles to deflect, according to the teachings of the invention.

The flag dipping circuit activates the reed relay (58)(59) to interrupt the radio signal into the receiver. Pulse generator (65) supplies a DC pulse of sufficient voltage to activate the reed relays in the T couplers to short out the incoming signal momentarily. Preferably, the pulses are approximately 0.1 seconds in length at intervals of approximately 8 seconds, following the pulses from the needle bobbing circuit by approximately 0.2 seconds. A trigger line (84) from the pulse generator (55) to the trigger input of the flag pulse generator (65), optionally through a delay timer, will serve to coordinate the pulses.

The DC pulses from pulse generator (65) are applied to the coaxial cables (52) and (53) leading to the T-couplers (50) and (51), after the capacitors (61) and (63), which would otherwise block the DC. RF chokes (62) and (64) isolate the high frequency radio noise signal from the DC pulse generator (65).

Many airplanes are equipped with only a single antenna for both glideslope and localizer, and a splitter (100) is used to couple the single antenna to the dual antenna inputs on the NAV receiver. Such a setup is shown in FIG. 9. Identical parts with FIG. 4 are shown with identical reference numbers, and will not be discussed in detail here.

The circuit of FIG. 4 can be used in this application without modification, using only one T-coupler in the single antenna line.

Alternatively, the single-antenna arrangement can be equipped with duplicate testing sections (101) and (103), one each for testing the glideslope and the localizer, respectively, allowing the needles to be bobbed independently instead of simultaneously. This arrangement is shown in FIG. 9, and makes use of bandpass filters.

The glideslope test unit (101 ) is essentially identical with the one in FIG. 4, except that the RF pulse output is passed through a band-pass filter (102) to pass the 330 to 335 MHz glideslope signals.

The localizer test unit (103) is similar, except that a different band-pass filter (104) is used to select signals in the 108 to 112 MHz localizer range. No flag pulse generator is required in the second unit, as the DC pulses for the reed relay are already present from the glideslope unit (101). A timing line (105) is used to trigger the localizer pulses after the glideslope pulses. If desired, a delay timer could be included to delay the timing signal (105) and introduce a time lag between the test pulses.

While the invention has been disclosed above in the context of the two-needle ILS indicator, it will be understood by one skilled in the art that it is equally applicable to other navigation indicators such as VOR/RNAV indicators, Horizontal Situation Instruments (HSI) displays, LORAN or GPS Course Deviation Indicators (CDI), or the like. Furthermore this invention can be applied to other indicators using needles and also the indicators which use Gas Discharge Indicators and LED/LCD type displays. This checking is relevant to displays other than the navigation instruments here described—it could beneficially be applied to any other electrical instrument in which the failure mode and the dormant indication are the same, such as ammeters (centered means the generator is OK, or the gauge has failed and the battery will soon be dead).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A method of enabling an operator to visibly verify the correct operation of a navigation instrument having a display comprising a visible indicator which deflects responsive to control signals from the navigation instrument, the method comprising causing periodic visible momentary deflections of the visible indicator of the display, the visible deflection of the visible indicator indicating correct operation, in which the navigation instrument is a radio receiver of the type which receives a navigation signal on an antenna input and causes the visible indicator of the display to reflect a navigation indication based upon the signal received, the condition of the navigation instrument when it is not receiving a navigational signal being termed its "no-signal condition", and the momentary deflections of the indicator are caused by feeding a periodic radio frequency signal into the radio receiver antenna input.

2. The method of claim 1, in which the periodic radio frequency signals are RF white noise.

3. The method of claim 2, in which the white noise is modulated by a signal which the radio receiver will interpret as a navigation signal and which will result in a visible deflection of the indicator of the display.

4. The method of claim 1, further comprising the step of periodically interrupting the signal reception of the radio receiver to test the no-signal condition of the navigation instrument.

5. The method of claim 4, in which the signal reception is interrupted by periodically connecting the antenna input of the receiver to ground.

6. A navigation instrument testing apparatus for enabling an operator to visibly verify the proper operation of a navigation instrument of the type which receives a navigation signal on an antenna input and causes a display having a visible indicator which deflects responsive to control signals from the navigation instrument to reflect a navigation indication based upon the signal received, comprising:

a. radio frequency signal generating means having an output which can be received by the navigation instrument;
   b. pulse generator means for generating periodic pulses having a pulse output;
   c. keying means for creating periodic bursts of radio frequency energy, having a radio frequency input connected to the radio frequency output of the radio frequency signal generating means, a keying input connected to the pulse output of the pulse generator means, and a radio frequency pulse output which transmits a pulse of the radio frequency signal from the radio frequency input when a pulse is present at the pulse input;
   d. coupling means for conducting the radio frequency pulse output of the keying means to the antenna input of the navigation instrument; and
   e. such that the radio frequency pulses output by the keying means causes the visible deflection of the visible indicator indicating proper operation.

7. The apparatus of claim 6, further comprising
   a. modulation signal generator means for generating a modulation signal which, if it were imposed upon a signal received by the navigation instrument, would cause the navigation indication on the display to deflect;
   b. modulator means for imposing the signal generated by the modulation signal generator upon the radio frequency output of the radio frequency signal generating means;

such that the radio frequency pulse output is modulated by a signal which, when the pulse is received by the navigation instrument, causes a momentary visible deflection of the visible indicator of the display, the visible deflection of the indicator indicating proper operation.

8. The apparatus of claim 7, in which the navigation instrument detects the differing audio frequency modulation tones on two directional signals from two radio transmitters, each of the directional signals defining a flight path, to determine the position of the instrument relative to the flight paths determined by the directional signals, and the modulation signal is the same as one of the audio frequency modulation tones, such that the navigation instrument will interpret the radio frequency pulse from the apparatus as an increase in amplitude of one of the radio signals.

9. The apparatus of claim 8, in which the navigation instrument is an instrument landing system receiver.

10. The apparatus of claim 9, in which the modulation signal is a 90 Hz audio signal.

11. The apparatus of claim 9, in which the modulation signal is a 150 Hz audio signal.

12. The apparatus of claim 9 in which the instrument landing system uses a plurality of signals with different audio modulation frequencies to define a landing path, and the modulation is an audio signal which is swept in a range of frequencies from a low frequency which is lower than one of the audio modulation frequencies used by said instrument landing system to a higher frequency which is higher than said instrument landing system audio modulation frequency.

13. The apparatus of claim 6, in which the radio frequency signal generator means is an RF white noise generator.

14. The apparatus of claim 6, in which the radio frequency signal generator means is a swept RF signal generator.

15. The apparatus of claim 6, in which the coupling means comprises a T-coupler comprising:

a. an input connected to an antenna lead;

b. an output, connected to the input, connected to the navigation instrument antenna input;

c. a second input for accepting the pulses from the radio frequency pulse output of the apparatus; and d. pulse transmitting means for coupling the pulses from the second input to the output connected to the navigation instrument antenna input.

16. The apparatus of claim 15, in which the pulse transmitting means is a coil.

17. The apparatus of claim 16, in which the coil is the operating coil of a relay having normally open contacts which close in response to a DC pulse on the coil, which contacts are connected across the input of the coupling means, such that when a DC pulse is present on the second input, the radio signals at the input are prevented from passing through to the output.

18. The apparatus of claim 17 in which the testing apparatus further comprises a DC pulse generator having a pulse output for generating periodic DC pulses, connected to the radio frequency pulse output, such that the DC pulses cause the relay of the coupling means to activate, periodically preventing the radio signals at the input of the coupling means from passing through to the output of the coupling means.

* * * * *